United States Patent
Almers et al.

(10) Patent No.: US 12,051,253 B2
(45) Date of Patent: Jul. 30, 2024

(54) METHOD AND APPARATUS FOR TRAINING A NEURAL NETWORK CLASSIFIER TO CLASSIFY AN IMAGE DEPICTING ONE OR MORE OBJECTS OF A BIOLOGICAL SAMPLE

(71) Applicant: CellaVision AB, Lund (SE)

(72) Inventors: Martin Almers, Lund (SE); Adam Morell, Lund (SE); Kent Stråhlén, Kävlinge (SE)

(73) Assignee: CellaVision AB, Lund (SE)

( * ) Notice: Subject to any disclaimer, the term of this patent is extended or adjusted under 35 U.S.C. 154(b) by 708 days.

(21) Appl. No.: 17/254,815

(22) PCT Filed: Jun. 13, 2019

(86) PCT No.: PCT/EP2019/065576
§ 371 (c)(1),
(2) Date: Dec. 21, 2020

(87) PCT Pub. No.: WO2020/007587
PCT Pub. Date: Jan. 9, 2020

(65) Prior Publication Data
US 2021/0264130 A1    Aug. 26, 2021

(30) Foreign Application Priority Data
Jul. 2, 2018 (SE) .................... 1850827-5

(51) Int. Cl.
*G06V 20/69* (2022.01)
*G06N 3/084* (2023.01)
(Continued)

(52) U.S. Cl.
CPC ........... *G06V 20/695* (2022.01); *G06N 3/084* (2013.01); *G06T 7/0012* (2013.01); *G06T 7/90* (2017.01);
(Continued)

(58) Field of Classification Search
CPC ............... G06F 18/253; G06N 3/084; G06T 2207/10056; G06T 2207/20081;
(Continued)

(56) References Cited

U.S. PATENT DOCUMENTS

2008/0033658 A1\* 2/2008 Dalton ................... G16H 10/20
 702/19
2010/0002929 A1\* 1/2010 Sammak ............... G06T 7/0014
 382/133

(Continued)

FOREIGN PATENT DOCUMENTS

| GB | 2524227 A | 9/2015 |
|---|---|---|
| WO | 2014/131013 A1 | 8/2014 |
| WO | 2017/155869 A1 | 9/2017 |

OTHER PUBLICATIONS

Abdullah -Al Nahid ,"Local and Global Feature Utilization for Breast Image Classification by Convolutional Neural Network," Dec. 21, 2017, 2017 International Conference on Digital Image Computing: Techniques and Applications (DICTA), pp. 1-4.*

(Continued)

*Primary Examiner* — Omar S Ismail
(74) *Attorney, Agent, or Firm* — Christensen O'Connor Johnson Kindness PLLC

(57) ABSTRACT

The disclosure relates to a method for training a neural network classifier (100) to classify a digital image depicting one or more objects of a biological sample into a specific class, which class belongs to a predefined set of classes (C1-C3), the method comprising: providing a training set of digital images (110*a-s*) originating 5 from a plurality of biological samples, each digital image (110*a*) of the training set being labeled with a specific class (C1) of the one or more objects of the digital image (110*a*), each digital image (110*a*) of the training set being associated with global data (114*a*) pertaining to the respective sample, training the (Continued)

neural network (100) using pixel data of each digital image (110a) from the training set of digital 10 images (110a-s) and the global data (114a) associated with said digital image (110a) as input, and using the specific class (C1) of the label of said digital image (110a) as a correct output from the neural network (100). The disclosure further relates to an analyzing apparatus (400).

21 Claims, 5 Drawing Sheets

(51) Int. Cl.
    *G06T 7/00*     (2017.01)
    *G06T 7/90*     (2017.01)
    *G06V 10/44*     (2022.01)
    *G06V 10/56*     (2022.01)
    *G06V 10/80*     (2022.01)
    *G06V 10/82*     (2022.01)

(52) U.S. Cl.
    CPC .......... *G06V 10/454* (2022.01); *G06V 10/806* (2022.01); *G06V 10/82* (2022.01); *G06V 20/698* (2022.01); *G06T 2207/10056* (2013.01); *G06T 2207/20081* (2013.01); *G06T 2207/20084* (2013.01); *G06V 10/56* (2022.01)

(58) Field of Classification Search
    CPC ......... G06T 2207/20084; G06T 7/0012; G06T 7/90; G06V 10/454; G06V 10/56; G06V 10/806; G06V 10/82; G06V 20/695; G06V 20/698
    See application file for complete search history.

(56) References Cited

U.S. PATENT DOCUMENTS

| | | | | |
|---|---|---|---|---|
| 2014/0273081 | A1* | 9/2014 | Cremins | G01N 33/4915 435/40.5 |
| 2014/0273082 | A1* | 9/2014 | Cremins | G01N 15/1433 435/40.5 |
| 2017/0169567 | A1* | 6/2017 | Chefd'Hotel | G06T 7/0012 |
| 2018/0211380 | A1* | 7/2018 | Tandon | G06V 20/69 |
| 2018/0286040 | A1* | 10/2018 | Sashida | G06F 18/2414 |
| 2018/0327807 | A1* | 11/2018 | Hanemaaijer | C12Q 1/18 |
| 2019/0228527 | A1* | 7/2019 | Ramirez | G16H 10/40 |

OTHER PUBLICATIONS

Rezaeilouyeh, H., et al., "Microscopic Medical Image Classification Framework via Deep Learning and Shearlet Transform," Journal of Medical Imaging, Society of Photo-Optical Instrumentation Engineers, 3(4):Oct. 2016.pp. 44501-1 to 44501-9.*
Rodrigues, L. F., et al., "HEp-2 cell Image Classification Based on Convolutional Neural Networks," 2017 Workshop of Computer Vision, Natal, Brazil, Oct. 2017, pp. 13-18.*
Khan, A.M., et al., "A Nonlinear Mapping Approach to Stain Normalization in Digital Histopathology Images Using Image-Specific Color Deconvolution," IEEE Transactions on Biomedical Engineering, 61(6):Jun. 2014, pp. 1729-1736.*
Christof Angermueller, "Deep learning for computational biology, "Oct. 16, 2020, Molecular systems biology ( 2016)12:878, pp. 1-9.*
Roopa B. Hegde, "Comparison of traditional image processing and deep learning approaches for classification of white blood cells in peripheral blood smear images," Feb. 20, 2019, biocybernetics and biomedical engineering 39( 2019), pp. 382-388.*
Jun Xu, "A Deep Convolutional Neural Network for segmenting and classifying epithelial and stromal regions in histopathological images,"Feb. 17, 2016, Neurocomputing 191(2016), pp. 214-220.*
International Search Report and Written Opinion mailed Oct. 9, 2019, issued in International patent application No. PCT/EP2019/065576, filed Jun. 13, 2019, 15 pages.
Komura, D., and S. Shikawa., "Machine Learning Methods for Histopathological Image Analysis", Computational and Structural Biotechnology Journal, vol. 16, pp. 34-42, Feb. 2018.
Mehanian, C. et al., "Computer-Automated Malaria Diagnosis and Quantitation Using Convolutional Neural Newwokks," 2017 IEEE International Conference on Computer Vision Workshops, Venice, Italy, Oct. 2017, pp. 116-125.
Nahid, A.-A., and Y. Kong, "Local and Global Feature Utilization for Breast Image Classification by Convolutional Neural Network," 2017 International Conference on Digital Image Computing: Techniques and Applications (DICTA), IEEE, Nov. 2017, 6 pages.
Rezaeilouyeh, H., et al., "Microscopic Medical Image Classification Framework via Deep Learning and Shearlet Transform," Journal of Medical Imaging, Society of Photo-Optical Instrumentation Engineers, 3(4):44501-1 to 44501-12, Oct. 2016.
Office Action and Search Report mailed Feb. 12, 2019, issued in Swedish Application No. 1850827-5, filed Jul. 2, 2018, 11 pages.
Khan, A.M., et al., "A Nonlinear Mapping Approach to Stain Normalization in Digital Histopathology Images Using Image-Specific Color Deconvolution," IEEE Transactions on Biomedical Engineering, 61(6):1729-1738, Jun. 2014.

* cited by examiner

METHOD AND APPARATUS FOR TRAINING A NEURAL NETWORK CLASSIFIER TO CLASSIFY AN IMAGE DEPICTING ONE OR MORE OBJECTS OF A BIOLOGICAL SAMPLE

FIELD OF THE INVENTION

The present invention relates to a method for training a neural network classifier to classify a digital image depicting one or more objects of a biological sample into a specific class.

BACKGROUND ART

Classification of biological samples is of importance for example within the fields of histology and pathology. Typically, a biological sample is removed from e.g. a patient and disposed on a microscope slide for being imaged using a microscope. Often, the result of such a classification is useful for determining a diagnosis of a patient. In the past, classification was carried out manually by a trained pathologist, as time-consuming process. Often, several thousands of objects, such as e.g. blood cells, may be present in a sample, and the accuracy of a sample analysis may depend on effectively and accurately classifying a great number of these objects.

Today, this task may be performed digitally using computerized image analysis. In the field, artificial neural networks have gained a lot of interest in later years, as computer power has increased and efficient and suitable algorithms have become readily available. Artificial neural networks may be pre-trained by using a set of digital images depicting objects (e.g. cells) of known class, thus allowing the classifier to become efficient and accurate for a specific classification task.

However, still the task is difficult to perform accurately as objects such as e.g. biological cells often have similar appearance which increases the influence of background noise and measurement bias on algorithm predictions. There is thus a need in the art for an improved method of training and using artificial neural network based classifiers for classifying digital images depicting objects of biological samples.

SUMMARY

It is an object to mitigate, alleviate or eliminate one or more of the above-identified deficiencies in the art and disadvantages singly or in any combination and solve at least the above mentioned problem.

According to a first aspect, these and other problems are solved in full, or at least in part, by a method for training a neural network classifier to classify a digital image depicting one or more objects of a biological sample into a specific class, which class belongs to a predefined set of classes, the method comprising:
providing a training set of digital images originating from a plurality of biological samples, each digital image of the training set being labeled with a specific class of the one or more objects of the digital image, each digital image of the
training set being associated with global data pertaining to the respective sample, training the neural network using image data pertaining to each digital image from the training set of digital images and the global data associated with said digital image as input, and using the specific class of the label of said digital image as a correct output from the neural network.

In essence, the method aims at improving the classification by inputting global data to the classifier together with the images. This way, the classifier will not only, more or less blindly, analyze each image separately, but will instead do so in a context. Classification may be improved by decreasing the influence of bias and noise on the result. This may lead to an improved classification success score as well as extending the capability of the classifier to correctly classify digital images which may would have been too complex to be classified with a conventional classifier. As will be further discussed later, the global data may be related to images of neighboring objects, aspects of the biological sample itself, data regarding the image capture/microscopy previously performed on the sample, the patient from which the sample originates etc. The method may be advantageous as it allows for reducing the influence of experimental bias and/or noise on the classification of the images. Thus, the method may require less re-training for different sets of images. The method may thus be more generally applicable. The training set of digital images may be provided directly to the neural network classifier. Alternatively, or additionally, the training set of digital images may first be processed by a preprocessing step to produce an intermediate data carrier which is subsequently provided to the neural network classifier.

The biological sample may comprise a large number of objects. The digital image may only depict a sub set of the total number of objects of the sample. The digital image may, alternatively, comprise individual objects. In the latter case, each digital image comprises one object.

According to some embodiments, the one or more objects comprise one or more biological cells. Such biological cells may be e.g. blood cells, cancer cells etc.

According to some embodiments, the method comprises: for each digital image of the training set of digital images: deriving a first set of input values, wherein each input value pertains to a specific feature of the digital image, deriving, based at least in part on said associated global data, second set of input values, defining a feature vector comprising said first set of input values and said second set of input values, and the neural network classifier determining, based on the feature vector, a specific class to assign to the digital image.

This may be an advantage as it allows for using available neural networks without modification. The deriving of the first set of input values may be achieved using a subnet part of the neural network but may alternatively be achieved by other means as will be further discussed later.

The first set of input values and the second set of input values may be determined automatically, for example by the neural network classifier itself. In such a case, the neural network classifier performs the classification based on the feature vector comprising information pertaining to both the image and the global data associated with the image. Thus, dependent on the chosen filters and network architecture, the relative number of input values pertaining at least in part to the global data (i.e. the second set of input values) may differ. For some cases, the first set of input values may constitute a majority of the feature vector elements, and for other cases the second set of input values may dominate.

According to some embodiments, the neural network classifier comprises a decision subnet being adapted to receive the feature vector and perform the step of determining the specific class to assign to the digital image.

According to some embodiments, the global data includes data pertaining to an average color of depicted objects of a set of digital images, wherein each digital image of the set depicts one or more objects of a specific biological sample.

This may be advantageous as it may make the method less influences by measurement bias occurring when staining the biological sample prior to analysis. The staining, which is carried out using a color agent to achieve a better contrast between object and background, may as a result from the staining process introduce a bias between different samples. Thus, a classifier pre-trained with a set of images captured from a first sample may not provide enough accuracy in its classification when used on a set of images captured on a second sample in case the first and second sample has somewhat different staining.

According to some embodiments, the biological sample is one from the list of: a blood sample, a cytological sample, a pathological sample, a histological sample.

According to some embodiments, the neural network classifier further comprises a feature extraction subnet adapted to receive the digital image of the training set, derive the first set of input values therefrom, and populate the feature vector with said first set of input values. The neural network classifier may be a convolutional neural network.

Using a convolutional neural network may be advantageous as is allows for a more efficient and accurate feature extraction. It also simplifies the procedure as the feature extraction may be automated and incorporated as part of the classifier, thus avoiding the prerequisite to prepare feature values in advance using alternative methods. It also allows for using the feature extraction subnet to work on the global data. Specifically, according to some embodiments, said second set of input values of the feature vector is derived by the feature extraction subnet. This may further simplify the method. Another advantage is that the processing performed by the feature extraction subnet may achieve a better accuracy of predictions than if inputting the second set of input values via the feature vector into the decision subnet.

According to some embodiments, at least a part of said associated global data is coded into pixel data of the respective digital image of the training set such that said at least a part of the global data is being input to the feature extraction subnet as a part of the digital image. This may be advantageous as it allows for an even more simplified and streamlined process of classification. Each image is prepared in advance, and coded so as to contain the associated global data within the pixel data. The feature extraction subnet may then receive a single input, i.e. the image, containing both the real image and the global data.

According to some embodiments, at least a part of said associated global data is coded into a coherent area of the pixel data of the respective digital image. This may be an advantage as it allows separating the global data from the relevant image data. Most often, objects are only occupying a mid-section of a digital image, thus leaving peripheral parts open for housing the global data. The global data may then be incorporated within the digital image as an image patch. If no part of the original image can be used, there is also a possibility to extend the image by adding new pixels on one or more sides of the original image, wherein the new pixels may house the global data. The global data may be incorporated as a bar code, a text, numbers, or the like. Specifically, according to some embodiments, the coherent area of the pixel data is color coded so as to reflect a color information included in the global data. This may be an advantage when the global data pertains to a color information, such as an average color of a set of digital images. For example, an average color of stained biological cells from a set of images each depicting a respective one of the stained biological cells may be calculated in advance, whereby each one from the images of the set is supplied with the resulting average color as a part of the pixel data of the image. Thus, each image will contain the information based on other images within the set. It is understood that the color coded image information may be useful for other kind of global data as well. The color code, often being an RGB-code, may be used as a three-digit data container.

The global data may comprise information obtained in other ways than discussed hereinabove. According to some embodiments, the global data includes data acquired based on an analysis of at least one digital image depicting a calibration area of a microscope slide.

The microscope slide may comprise many alternative elements and/or substances in the calibration area depending on the type of calibration. For example, the microscope slide may comprise one or more calibration substances disposed in the calibration area. Such a calibration substance may be e.g. a sample of known concentration of cells, such as e.g. white blood cells. A calibration substance may alternatively be e.g. synthetic blood having nuclei particles resembling blood particles. The calibration substance(s) may be disposed onto a microscope slide by a lab technician prior to imaging the microscope slide.

According to some embodiments, the microscope slide comprises one or more chemical reference patches disposed in the calibration area, wherein said chemical reference patches are arranged to react to substances in contact therewith. This implies that the data acquired based on said analysis pertains to a respective appearance of the one or more chemical reference patches. The data acquired based on said analysis may pertain at least to a respective color of the one or more chemical reference patches. However, the data may alternatively or additionally pertain to other characteristics of the one or more chemical reference patches, such as e.g. a brightness of the one or more chemical reference patches.

This may be advantageous as global data pertaining to the appearance of one or more chemical reference patches may be input to the classifier without first having to perform a calculation of a corresponding appearance from the digital images depicting the sample. Global data pertaining to the appearance of one or more chemical reference patches may suffer less from noise and potential bias in the digital images, thus providing global data of improved quality.

According to some embodiments, each of the one or more chemical reference patches is arranged to react to a respective staining agent used for staining the biological sample.

The chemical reference patches are arranged to react in a controlled way to individual components of a respective staining agent. Such staining agents are often used to enhance contrast of the cells within the sample. As a problem sometimes is that each sample may obtain a somewhat different appearance, such as a different color, or brightness, due to a bias introduced during staining (even if using the same kind of sample, staining agent and staining methodology, the stained cells may still show some variation in appearance). Thus, information retrieved by imaging the chemical reference patches in the analyzer may be used as a reference to the analysis. Specifically, for the method of the disclosure, said information may be input to a neural network classifier as global data. Thus, it is understood that adding global information pertaining to the staining of the biological sample may provide global information which is not retrievable based solely on an analysis of the digital images depicting stained objects of the biological sample.

Thus, global information pertaining to the appearance of the one or more chemical reference patches may provide an improved success score of digital image classification.

The chemical reference patches may be arranged to react to a respective staining agent by each chemical reference patch having a high binding affinity for a specific component of a staining agent used to stain the biological sample. For example, a chemical reference patch may have a high binding affinity for hematoxylin, a commonly used staining agent e.g. for staining nuclei purple. Alternatively, a chemical reference patch may have a high binding affinity for eosin, another commonly used staining agent, used e.g. to stain cytoplasm red/pink. The chemical reference patches may be adapted to a specific staining technique, such as e.g. the Papanicolau staining technique or the Romanowsky staining technique. In such a case, a plurality of chemical reference patches may be used. Global data may thus pertain to a plurality of colors, each color associated with a respective staining agent.

According to some embodiments, each staining agent is at least one from the list of: hematoxylin, eosin, orange G, eosin Y, light green SF yellowish, Bismarck Brown Y, eosinate, methylene blue, azure B, azure A, and methylene violet.

According to some embodiments, the microscope slide comprises one or more imaging test targets disposed in the calibration area, wherein the data acquired based on said analysis pertains at least to the shape of the one or more imaging test targets. Thus, the data acquired based on the analysis may, alternatively or additionally, pertain at least to the shape of one or more imaging test targets of the microscope slide. Such imaging test targets may be for example resolution test targets adapted to be used for determining a spatial resolution of an imaging system. The microscope slide may thus be adapted to measure optical characteristics of a device for acquiring digital images depicting one or more objects of a biological sample. Such a device may be e.g. the analyzing device of the present disclosure. Such optical characteristics include e.g. spatial resolution, and reference size.

According to some embodiments, the microscope slide is a calibration microscope slide adapted to be used to calibrate a device for capturing the digital image depicting one or more objects of a biological sample.

It is conceivable that a microscope slide having calibration elements, such as e.g. chemical reference patches, further comprises a biological sample disposed on a portion of its surface. Alternatively, the microscope slide does not comprise a biological sample. Such a microscope slide may be a calibration microscope slide. The calibration microscope slide may be adapted to be used to calibrate a device for acquiring digital images depicting one or more objects of a biological sample. Such a device may be e.g. the analyzing device of the present disclosure. The calibration slide may be inserted before measurement starts, whereby a calibration routine is run.

According to some embodiments, said at least a part of said global data is coded into four coherent areas of the pixel data of the digital image, each coherent area being located in a respective corner of the digital image. This may be advantageous as it further simplifies the process as images no longer may need to be input to the classifier using the same orientation. This also introduced the advantageous option of training the convolutional neural network using the same image four times in all four orientations, thus achieving an improved level of training using a predefined number of images within a training set of images.

According to some embodiments, the neural network classifier consists of two or more fully connected layers, the neural network classifier preferably being a multi-layer perceptron. This may be an advantage is some applications where convolutional neural networks are not available. Global data is here input to the neural network via an input vector comprising already determined first and second set of input values. The input vector for the neural network is thus analogous to the feature vector discussed earlier. The neural network may be a multilayer perceptron. Alternatively, the neural network may be a probabilistic neural network, a time delay neural network, an autoencoder, or a radial basis function network.

It is understood that the decision subnet of a neural network classifier of the invention may consist of fully connected layers such as the multilayer perceptron. For some embodiments, this may be the only layers of the neural network classifier. Such neural network classifiers may lack a feature extraction subnet. It is further understood that in a case where the neural network classifier comprises both a feature extraction subnet and a decision subnet, the feature extraction subnet may not necessarily be involved in handling the global data. It may, alternatively be involved to some degree. For example, global data may be input to a feature extraction subnet of a neural network classifier in an intermediate layer (sometimes termed inner layer), by e.g. retrieving an output from an intermediate layer, adding global data values thereto, and inputting the altered output from the inner layer as input to the next in line intermediate layer of the feature extraction subnet. If the feature extraction subnet forms a part of a convolutional neural network, such an intermediate layer may be a convolutional layer.

It is further understood that the feature extraction subnet may be a neural network, such as an MLP. In such a case, feature extraction is carried out in a first neural network (i.e. acting as feature extraction subnet), and decision is carried out in a second neural network (i.e. acting as decision subnet).

The global data may pertain to more than color information. For example, according to an embodiment, the global data further includes data pertaining to a patient from which the biological sample originates. This may be medical data, such as test results from medical tests previously performed on the patient, the age of the patient, the blood group of the patient, the BMI of the patient.

As an example, for correctly classifying certain types of cells within cytology, the time position within the menstrual cycle at which the sample was retrieved will be important. Also, the age of a patient may determine appearance and behavior of some cells. For example, the appearance of cells from a patient of a certain age may be regarded as malign, whereas the same, or similar, appearance of cells may be regarded as normal if the cells had originated from a patient having another age.

Another area where the method may be applicable, is to classify objects, such as cells, from animals. For accurately classifying animal cells, the animal species can be of importance as cell appearance may differ between species. It is conceivable that global data may comprise data pertaining to animal classification, i.e. taxonomic ranks such as species, genus, family, order, class, phylum, kingdom, domain, etc.

According to a second aspect there is provided a method for classifying a digital image depicting one or more objects of a biological sample into a specific class, which class belongs to a predefined set of classes, the method comprising:

feeding a digital image depicting one or more objects of a biological sample into a neural network classifier, the neural network classifier being trained for classifying digital images into one of the predefined set of classes using the method according to the first aspect, feeding global data associated with the sample into the neural network classifier, and the neural network classifier determining, based on at least said digital image and said global data, a specific class to assign to the digital image.

The method of the second aspect is the user analogue of the training method disclosed herein with reference to the first aspect. Thus is associated with the same advantages as the first aspect. Often, the digital image is a sub image originating from a main digital image depicting a plurality of objects of a biological sample. The main digital image may depict a portion of the biological sample. Thus, sub images of the main image each represents a part of the sample. However, each sub image will depict a unique objects present within the sample. It is emphasized, however, that the training set of digital imaged using to train the neural network classifier according to the first aspect comprises images depicting one or more objects from different samples.

According to a third aspect there is provided an analyzing device for optical analysis of a biological sample, said analyzing device comprising:

optics, including a camera, adapted to capture a digital image depicting one or more objects of a biological sample, a processor adapted to:

determine global data pertaining to the sample based on an analysis of the digital image, and/or receiving global data from an external source, associate the digital image with the global data, and perform the method according to the second aspect on the digital image.

According to a fourth aspect there is provided a computer-readable medium comprising computer code instructions which when executed by a device having processing capability are adapted to perform the methods according to the first or second aspects.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

Terminology

The term "global data" should be construed as data not comprised in, or not uniquely derivable from, the raw unprocessed digital image itself (however, later on, global data may be added to a raw unprocessed digital image as disclosed herein). Global data may be derivable from two or more digital images. An example of such global data is an average color of objects depicted in two or more digital images. Global data may be received from other sources associated with the digital image, but not a part of the digital image. An example of such global data is an average color of a reference sample on the microscope slide, patient data etc.

The term "feature extraction subnet" should be construed as a part of a neural network configured for extracting features from digital images. For a convolutional neural network, the feature extraction subnet is used to process the digital images using convolutional and other steps to finally output a feature vector comprising numeric values pertaining to the extracted features.

The term "decision subnet" should be construed as a part of a neural network configured to classify a digital image by performing a calculation on a feature vector pertaining to the images. The decision subnet may comprise e.g. a multilayer perceptron. The output from the decision subnet is an output vector comprising probabilities for each class.

BRIEF DESCRIPTIONS OF THE DRAWINGS

The invention will by way of example be described in more detail with reference to the appended schematic drawings, which shows presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The disclosure relates to methods of training, and using, neural networks for classifying a digital image depicting an object of a biological sample into a specific class. The object may for example be a biological cell, or a cell nucleus. The detailed description will describe the method using a series of example embodiments where different aspects of the method is discussed. The neural networks used in the different embodiments are sometimes different from each other.

Figure 1:
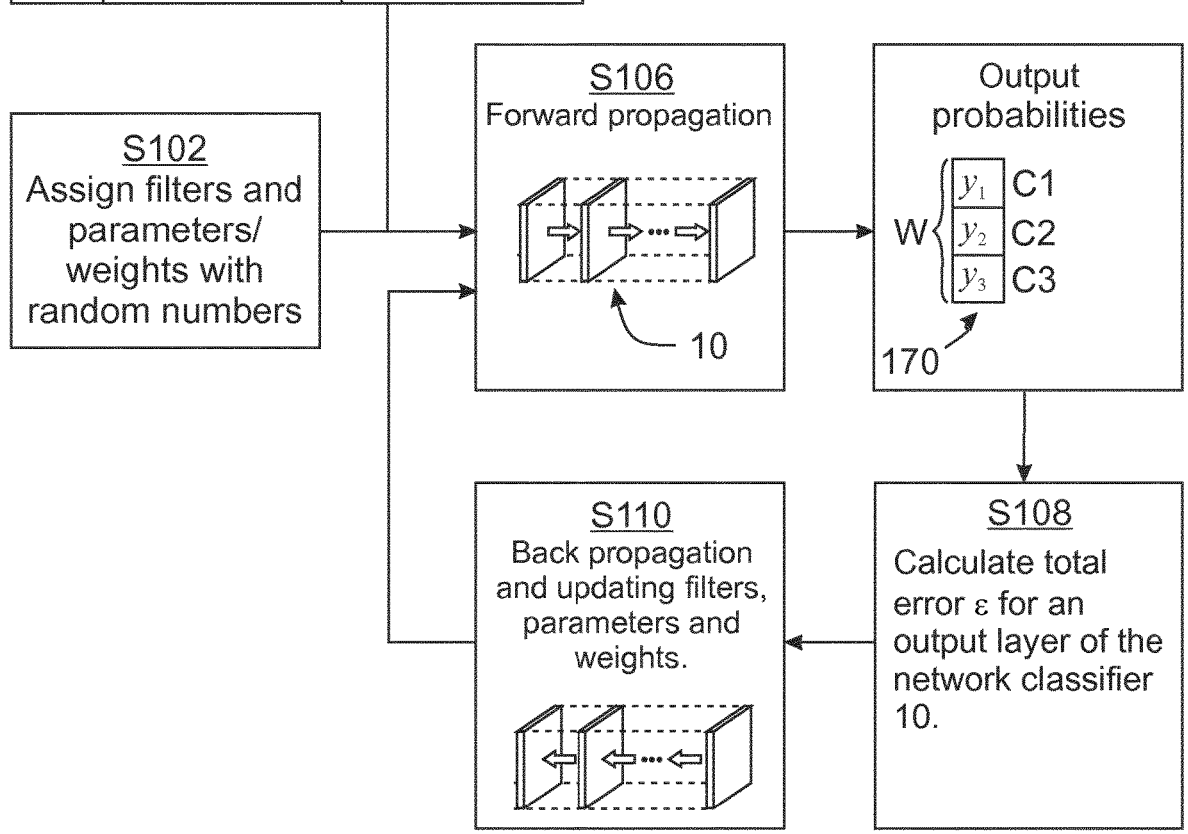
FIG. 1 shows a schematic view of a method for training a neural network according to an embodiment of the disclosure.

FIG. 1 shows a schematic view of a neural network 10 adapted to classify a digital image depicting an object of a biological sample into a specific class. In the example, the object is a biological cell. A method for training the neural network 10 will now be described with reference to FIG. 1. The purpose of the method is to train the neural network classifier 10 to classify a digital image depicting a biological cell of a biological sample into a specific class. The specific class belongs to a predefined set of classes C1-C3.

The method comprises providing a training set of digital images 110a-s originating from a plurality of biological samples. Each digital image of the training set is labeled with a specific class of the biological cell of the digital image, and each digital image of the training set is associated with global data pertaining to the respective sample. Thus, for the training set of digital images 110a-s used in the example of FIG. 1, six digital images 110a-g is labeled to belong to class C1. Each of the six digital images 110a-g is associated with a respective global data 114a-g. As all images are not originating from the same biological sample, the associated global data of one image is not necessarily the same as the associated global data for another, even if the images belong to the same class. Labeling images to a specific class may be done in several ways, and is known in the art of training neural networks. For example, images belonging to a specific class may be stored in a specific folder on a database from which the neural network classifier reads the images during training. As will be more clearly understood later when discussing the various embodiments, the images of the training set may be provided directly to the neural network. Alternatively, the images of the training set may be pre-processed by a preprocessing step not part of the neural network.

The method further comprises training the neural network 10 using image data pertaining to each digital image 110a from the training set of digital images 110a-s and the global data 114a associated with said digital image 110a as input. In the training, the specific class C1 of the label of said digital image 110a will be used as a correct output from the neural network 10.

More specifically, for each digital image 110a of the training set of digital images 110a-s, the method comprises deriving a first set of input values F, wherein each input value F pertains to a specific feature of the digital image 110a. As previously mentioned this step may be carried out by the classifier but may, alternatively, be carried out by a preprocessing step.

The method further comprises the step of deriving, based at least in part on said associated global data 114a, a second set of input values G. The first set of input values F and the second set of input values G then together defines a feature vector 160. Thus, the feature vector will contain both data pertaining to extracted features of the images, and data pertaining to the global data. The neural network classifier 10 then determines, based on the feature vector 160, a specific class C1 to assign to the digital image 110a.

Training of the neural network is usually carried out using backpropagation. Referring now to FIG. 1, a first step S102 is to initialize all filters and parameters/weights with random values. Then, the images 110a-s are input S104 to the neural network 10 and processed S106 through the neural network classifier 10 using forward propagation (i.e. the same way as being used when applying an already trained neural network for classification of digital images). The neural network 10 determines output probabilities Y (in the example: the values $y_1$, $y_2$ and $y_3$) for each labeled class C1-C3. As each image is labeled with a specific class, the determined output probabilities Y may be compared to the known, or "real", values: A total error, c, is calculated S108 for the output of the neural network classifier 10 based on the determined output probabilities and the real values. The total error is then distributed back through the network layers of the neural network 10 using backpropagation S110. In the process, gradients of the error with respect to all weights in the neural network 10 are calculated. Thus, an error after each layer of the network 10 is estimated during the process. Filter values/weights and parameter values are updated to minimize the output error of each layer. The minimization step may be carried out using the method of stochastic gradient descent. During the training process, these steps are carried out for all images of the training set of images 110a-s. For improved convergence, a batch of training images may be input to the neural network classifier 10, whereby the total error is calculated based on all images of the batch. Minimization is then carried out for all images of the batch at once.

Figure 2:
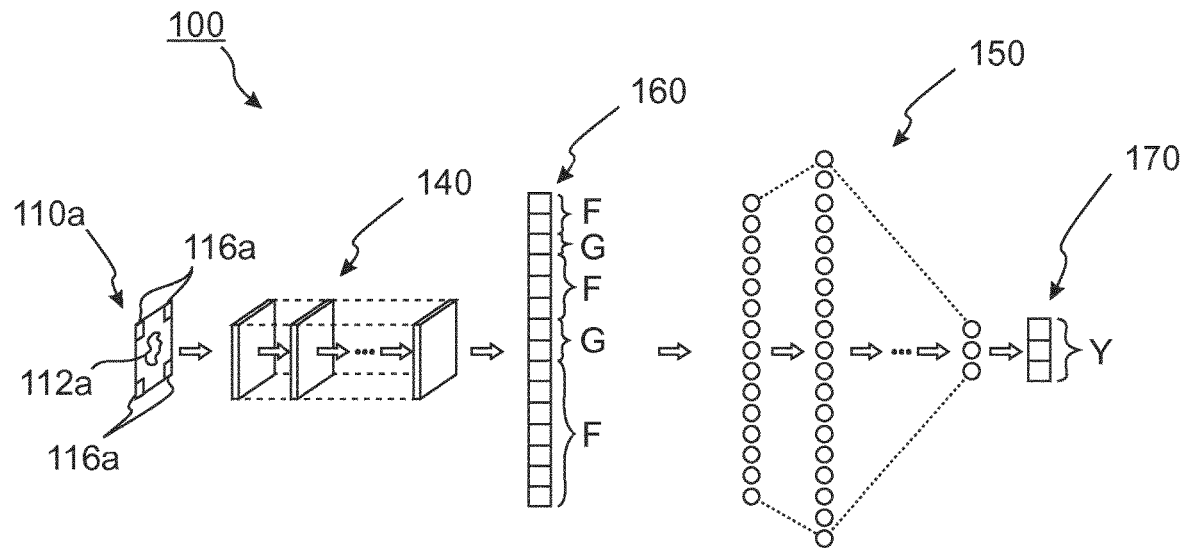
FIG. 2 shows a schematic view of a convolutional neural network classifier when being trained, and used for classification of digital images having global data coded into their pixel data, according to an embodiment of the disclosure.
Figure 3:
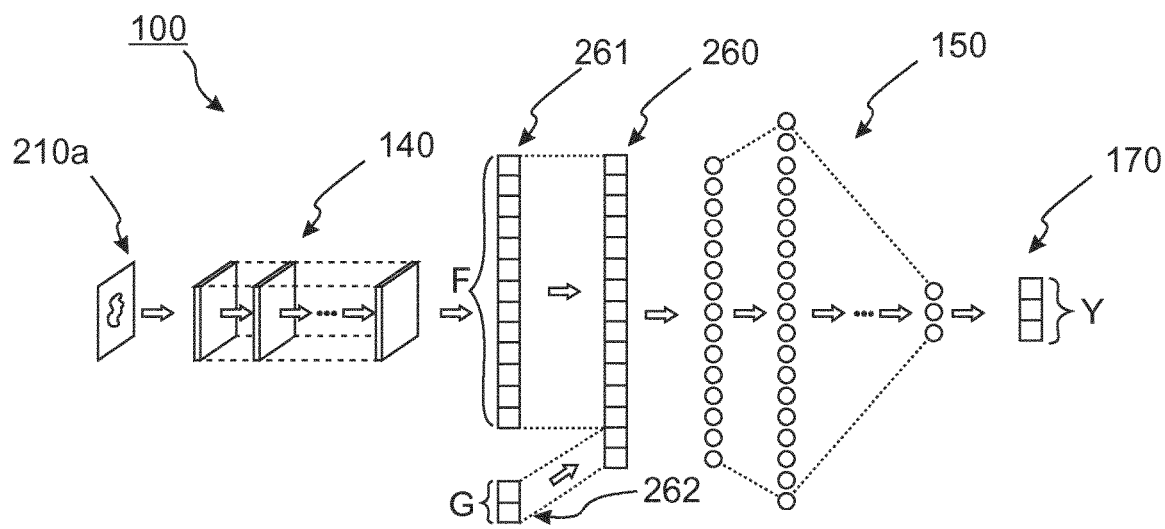
FIG. 3 shows a schematic view of the convolutional neural network classifier of FIG. 2 but where global data is not processed by the feature extraction subnet of the classifier.
Figure 4:
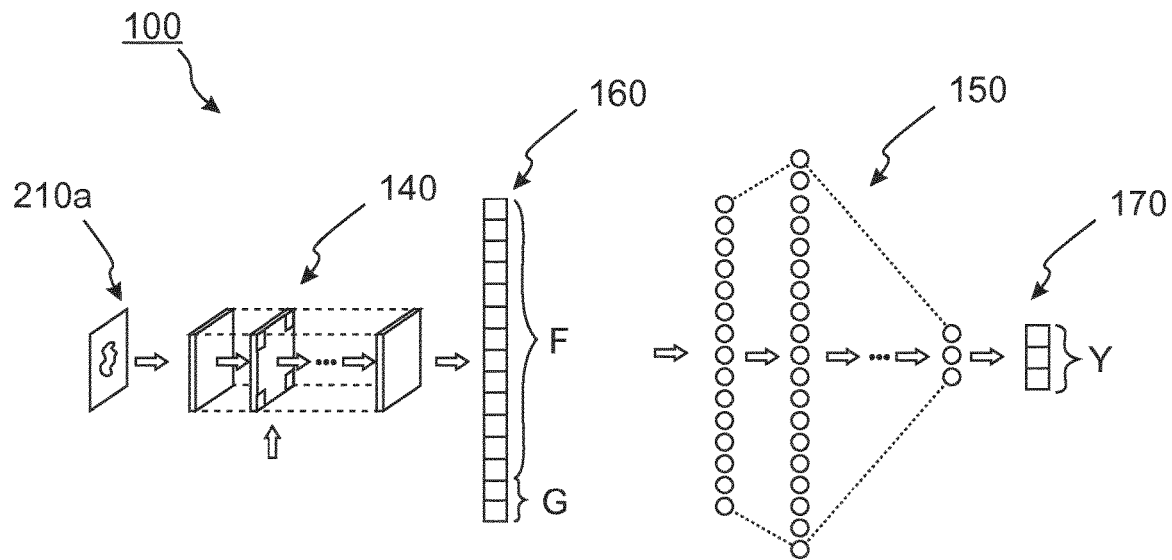
FIG. 4 shows a schematic view of the convolutional neural network classifier of FIG. 2 but where global data is separately input to an intermediate layer of the feature extraction subnet of the classifier.
Figure 5:
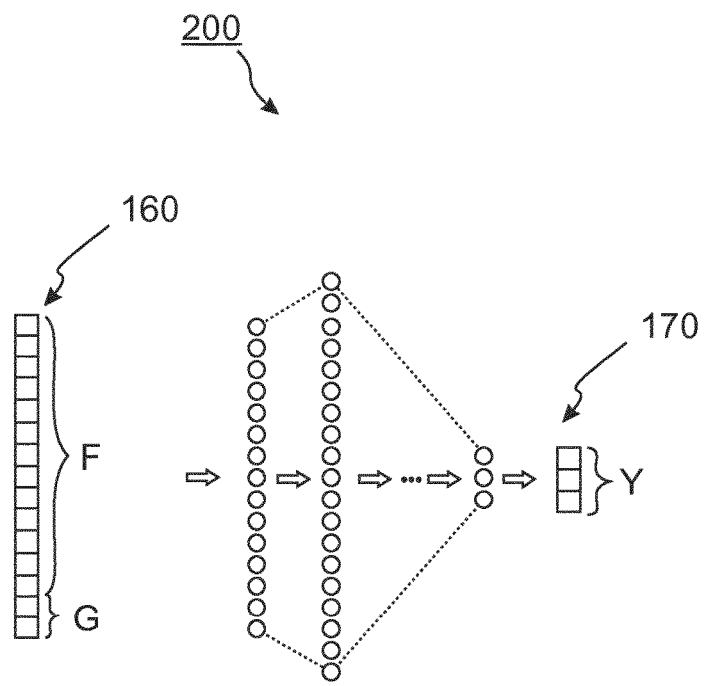
FIG. 5 shows a schematic view of a neural network classifier according to an embodiment of the present disclosure, wherein feature extraction is not performed by the neural network.

In the following detailed description, a number of example embodiments will be provided. The first examples discussed with reference to FIGS. 2-4 are based on the use of a convolutional neural network. The last example discussed with reference to FIG. 5 is based on the use of a multilayer perceptron. In the following description, a digital image 110a from the training set of digital images 110a-s will be used as an example image, the description being focused on forward propagation through the network. As appreciated by the skilled person, apart from the determining of the filter weights and parameters of the network, forward propagation during training of the network and during use of the trained network for classification is the same.

FIG. 2 shows a schematic view of a convolutional neural network 100. The convolutional neural network 100 comprises a feature extraction subnet 140 adapted to receive a digital image 110a of a training set of digital images and extract features therefrom. Feature extraction within a conventional convolutional neural network is well known in the art, and will therefore only be described in brief.

The feature extraction is carried out by convolution. Convolution preserves the spatial relationship between pixels by learning image features using small matrices of input data. These small matrices of input data are usually referred to as filters, and are slid over the input image and computed the dot product to provide an output matrix usually termed a feature map. Several filters may be used to detect different kind of features from the image. For example, filters may be arranged to sharpen the image, blur the image, detect edges of the image etc. During the training process, the convolutional neural network 100 adjusts the values of the filters as a part of the training process. For a given network architecture, input requested parameters are typically the number of filters and the size of the filters. The convolutional neural network 100 may have several convolutional layers, i.e. layers where a filter is convolved with the input to that layer. The convolutional neural network 100 may further comprise ReLU layers to introduce non-linearity in the data so as to better meet the non-linear nature of real-world data. Often, ReLU is carried out after each convolution step. The convolutional neural network 100 may further comprise pooling layers to perform down sampling of an input thereto. The purpose of the pooling layers is to progressively reduce the size of the input data. Finally, output data from the last layer of the convolutional neural network 100 is concatenated to form a feature vector 160 comprising a first set of input values F. Thus, the feature vector 160 will be populated with at least the first set of input values F derived by the feature extraction subnet 140.

Now, consider the image 110a shown in FIG. 2. The image 110a depicts a biological cell, such as e.g. a blood cell. Moreover, the image 110a presents four coherent areas 116 at the corners of the image 110a, where global data 114a (see FIG. 1) is coded into pixel data of the image 110a. In the example, the coherent area 116 of the pixel data is color coded so as to reflect a color information included in the global data 114a. The color information may be e.g. an average color of a plurality of images captured from a specific sample at a specific time. The method is, however, not limited to this embodiment as will be further described later. Moreover, there may be more global data 114a for the image 110a than being coded into the coherent areas 116. As can be readily appreciated by the skilled person, the present example allows for said at least a part of the global data 114a being input to the feature extraction subnet 140 as a part of the digital image 110a. Thus the step of inputting the image 110a and the step of inputting the associated global data 114a is in this case performed in a single step. By coding the global data 114a into four coherent areas 116 of the pixel data of the digital image 110a where each coherent area 116 is located in a respective corner of the digital image 110a, each image may be used several times during the training process, which allows for the reducing the total number of training images used. The processing of the image 110a through the convolutional neural network 100 will thus, in addition to the first set of input values F, populate the feature vector 160 with the second set of input values G. In the example embodiment, the first set of input values F and the second set of input values G are determined by the convolutional neural network 100 automatically. Thus, dependent on the chosen filters and network architecture, the relative number of input values pertaining at least in part to the global data 114a-s (i.e. the second set of input values G) may differ.

The neural network classifier 100 further comprises a decision subnet 150 being adapted to receive the feature vector 160 and perform the step of determining the specific class C1 to assign to the digital image 110a. The decision subnet 150 may consist of fully connected layers, such as for example a multilayer perceptron that uses a softmax activation function in the output layer to provide an output vector with probability values Y. The output vector 170 from the decision subnet 150 consists of two or more cells (in the example: three cells), each cell comprising a probability value Y determined by the convolutional neural network 100 as the likelihood for the image belonging to the specific class associated with the cell.

Global data may alternatively be added after the feature extraction subnet 140. This is exemplified in FIG. 3, which shows an alternative example embodiment of a method according to the disclosure. The difference between the embodiment of FIG. 3 and that already described with reference to FIG. 2 is that for the method of FIG. 3, the global data is input to the network in a different manner. Thus, the convolutional neural network 100 is the same. As for the digital image 110a, the digital image 210a depicts a biological cell. However, the digital image 210a lacks the global data being coded into coherent areas. Thus, for the method of FIG. 3, the global data is not processed through the feature extraction subnet 140. Instead, the global data is added in a separate step directly to the feature vector 160. As can be seen in FIG. 3, the feature vector 260 consists of two separate parts, the image feature vector 261 being the output layer from the feature extraction subnet 140, and the global feature vector 262, being added to the feature vector 260. The preparing of the global feature vector 262, which may comprise any number of vector cells (in the example: two cells), is here carried out outside of the network 100. The preparation may be carried out by means of algorithms and image analysis methods well known in the field of image feature extraction. Typically, features related to color, shape and texture are quantified. Segmenting algorithms such as snakes, thresholding, fast marching, level set, and Markov random fields may be used. Said preparation may be carried out using another neural network, such as e.g. a multilayer perceptron. In case global data are not obtained from images, such as for e.g. patient data, feature extraction is not needed. Instead, the global data is input to the neural network as a numerical value.

Global data may alternatively be added to an intermediate layer of the feature extraction subnet 140. This is exemplified in FIG. 4 showing the same convolutional neural network 100 as in FIG. 3 where the digital image 210a does not contain global data. The global data is instead here added in one of the intermediate layers of the feature extraction subnet 240. Data addition may in principal be carried out on any layer, such as a convolutional layer or a pooling layer. Typically, the one or more output images from a specific layer is extracted and global data added thereto, e.g. using the scheme with corner patches. The altered output images are then input to the subsequent layer in the network, thus allowing the subsequent layer, and the layers to follow, to process the global data. The rest of the method performs the steps outlined with reference to FIG. 2.

The examples described so far has been based on using a convolutional neural network 100. However, the method is not limited to convolutional neural networks. One example of a conventional neural network is provided in FIG. 5, showing a neural network classifier 200 consisting of two or more fully connected layers. The neural network classifier 200 in the example is a multi-layer perceptron that uses a softmax activation function in the output layer to provide an output vector with normalized probability values Y. For the method of FIG. 5, the feature vector 160 must be prepared in advance for example using image analysis-based feature extraction as detailed hereinabove. The feature vector is then input to the neural network 200 which is used to classify the image. It is understood that the method described here bears several similarities with the method described with reference to FIG. 3. However, it should be kept in mind, that the neural network 200 is not a convolutional neural network and thus lacks a feature extraction subnet. The input of the global data into the classifier is, however, performed in the same way for both methods. Additionally, the decision subnet 160 may be similar, or even equal to, the neural network 200.

Once the training of the neural network is completed, the neural network may be used for image classification. This is carried out using forward propagation as already mentioned herein. The method for classifying a digital image 110 depicting a biological cell into a specific class, which class belongs to a predefined set of classes C, thus comprises the following steps: Firstly, a digital image 110 depicting a biological cell is fed into a neural network classifier 100, 200, the neural network classifier 100, 200 being trained for classifying digital images 110 into one of the predefined set of classes C using the method for training described hereinabove. Then, global data 116 associated with the sample is fed into the neural network classifier 100, 200, and the neural network classifier 100 determining, based on at least said digital image 110 and said global data 116, a specific class to assign to the digital image.

Figure 6:
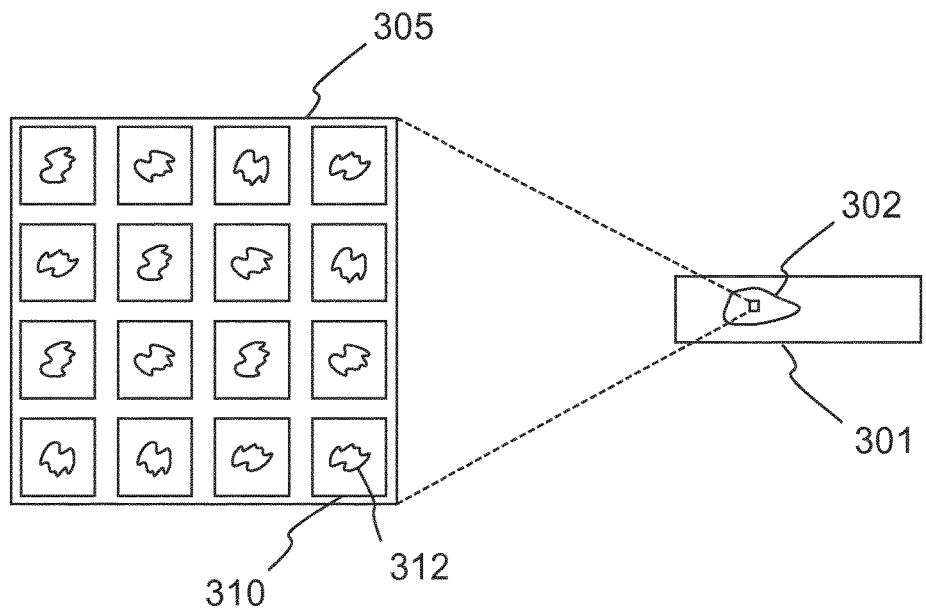
FIG. 6 shows a schematic view of a set of digital images depicting individual cells from a specific sample.

In the examples discussed herein, global data includes data pertaining to an average color of depicted biological cells of a set of digital images, wherein each digital image of the set depicts a biological cell from a specific biological sample. FIG. 6 shows an example embodiment of a sample 302 disposed on a microscope slide 301. From the sample, a plurality of digital images 306 are captured, for example by capturing one main digital image 305 which is subsequently cut into several sub images 310, each sub image 310 depicting a biological cell 312. Color information is then read from each of the plurality of digital images 306, whereby an average color value may be calculated. Said average color value may subsequently be coded into each of the digital sub images 310 as discussed earlier.

Figure 7:
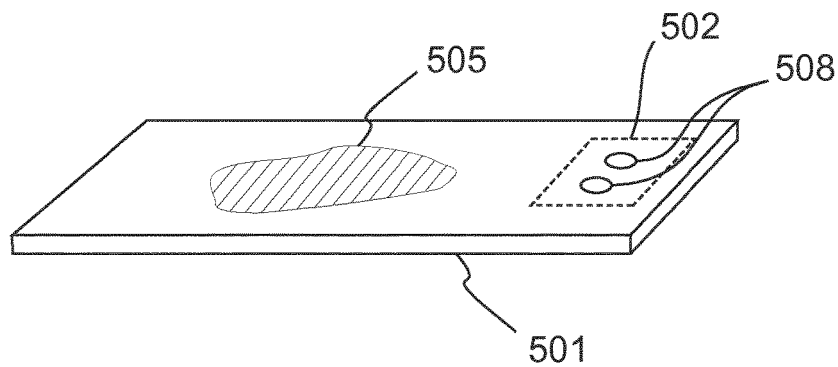
FIG. 7 shows a microscope slide on which a sample is disposed. The microscope slide also comprises chemical reference patches.

Global data may be derived in other ways. FIG. 7 shows an example of a microscope slide 501 on which the sample 505 is disposed. The microscope slide 501 has a calibration area 502 on a surface thereof. Global data 114a may include data acquired based on an analysis of at least one digital image depicting the calibration area 502 of the microscope slide 501. The calibration area 502 comprises two chemical patches 508 arranged to react to a respective staining agent used to stain the biological sample so as to prepare the sample for analysis. The staining agents are used to enhance contrast in the digital images depicting the sample. For example, a chemical reference patch may have a high binding affinity for hematoxylin, a commonly used staining agent e.g. for staining cell nuclei purple. Hematoxylin staining will hence enhance cell nuclei in relation to neighboring parts of the sample. Alternatively, a chemical reference patch may have a high binding affinity for eosin, another commonly used staining agent, used e.g. to stain cytoplasm red/pink. As each staining agent may result in a unique color of a respective chemical reference patch, it is understood that global data may pertain to a plurality of colors, each color associated with a respective staining agent. However, it is also conceivable that the global data pertains to other characteristics of the chemical reference patch, such as a brightness thereof.

Figures 8A, 8B:
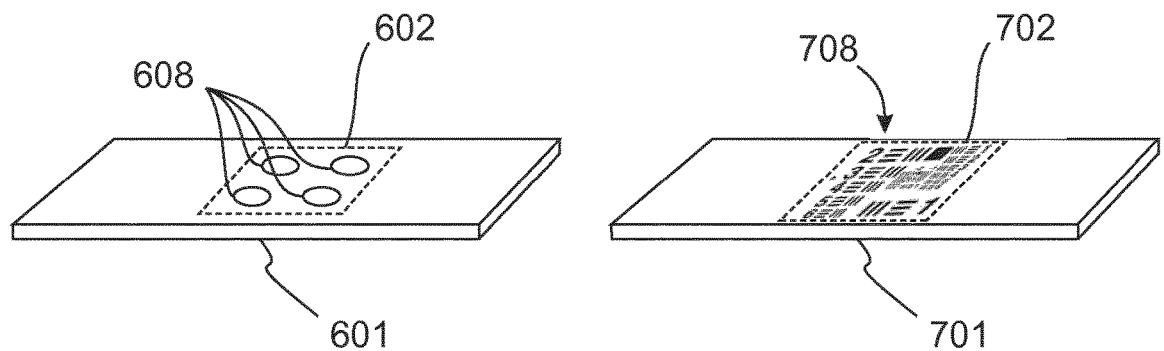
FIG. 8A shows a calibration microscope slide comprising a plurality of chemical reference patches according to an embodiment of the disclosure.
FIG. 8B shows a calibration microscope slide comprising an optical test target according to another embodiment of the disclosure.

In an alternative embodiment illustrated in FIG. 8A, chemical reference patches 608 are disposed in a calibration area 702 of a separate microscope slide 601 so as to form a calibration microscope slide 601. The calibration microscope slide 601 thus does not contain a biological sample. The calibration microscope slide 601 is adapted to be used to calibrate a device for acquiring digital images depicting one or more objects of a biological sample. One example of such a device is the analyzing device 400 disclosed hereinbelow. The calibration microscope slide 601 may be inserted into the device, prior to inserting the biological sample for capturing digital images thereof. For such a case, the global data may be compiled in advance based on readings from imaging the chemical reference patches 608 of the calibration slide 601.

The global data may pertain to more than an appearance of chemical reference patches. In an alternative embodiment illustrated in FIG. 8B, a calibration slide 701 may comprise a calibration area 702 comprising an imaging test target 708, such as a resolution test target. Thus, the data acquired based on the analysis of the at least one digital image depicting the calibration area 702 pertains at least to the shape of one or more imaging test targets 708 of the calibration area 702.

Specific examples of global data have been provided herein. However, global data may comprise other kind of data acquired in other ways. For example, according to an embodiment, the global data further includes data pertaining to a patient from which the biological sample originates. This may be medical data, such as test results from medical tests previously performed on the patient, the age of the patient, the blood group of the patient, or the BMI of the patient.

Figure 9:
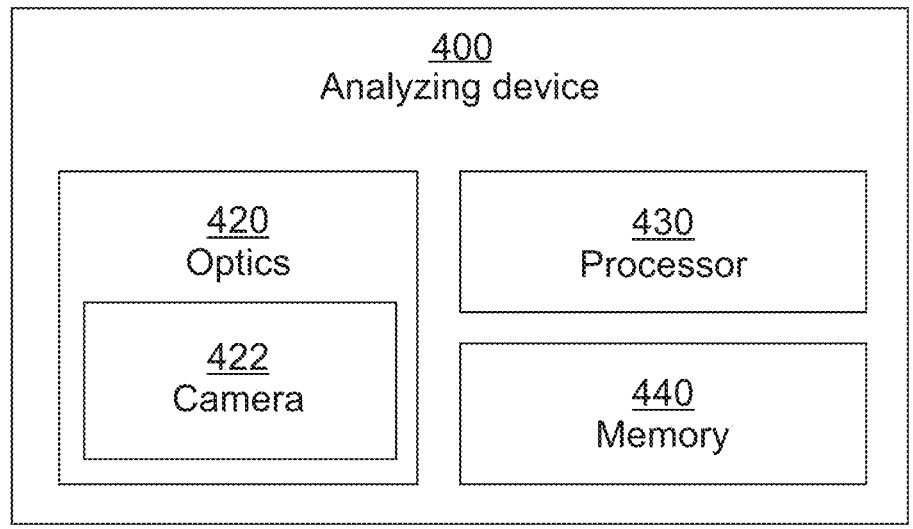
FIG. 9 shows a schematic view of an analyzing device for optical analysis of a biological sample according to an embodiment of the disclosure
Figure 9:
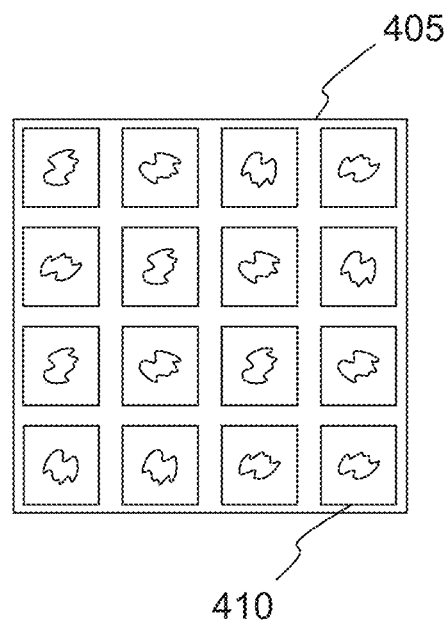

The disclosure further relates to an analyzing device, an example embodiment of which is shown in FIG. 9. The illustrated analyzing device 400 is intended for optical analysis of a biological sample. Thus, a biological sample is input to the analyzing device 400 for example on a microscope slide. The analyzing device 400 comprises optics 420, including a camera 422, adapted to capture a main digital image 405 depicting a plurality of objects, such as biological cells, of the biological sample. The optics 420 includes a microscope for providing enough magnification of the sample for successfully imaging objects thereof. The analyzing device 400 further comprises a processor 430 adapted to segment the main digital image 405 into a plurality of digital images 410, wherein each image depicts one stained object. The processor 430 is further adapted to determine global data pertaining to the sample based on an analysis of the main digital image 405 depicting the sample, and/or receiving global data from an external source, associate each digital sub image 410 with the global data, and perform the method according to the disclosure. The analyzing device 400 further comprises a memory 440 adapted to provide storage to digital images and/or software of the analyzing device 400. In the example, the method according to one or more example embodiments disclosed herein is comprised on the memory 440, said memory thus being a computer-readable medium comprising computer code instructions which when executed by a device having processing capability are adapted to perform said method.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A method for training a neural network classifier to classify a digital image depicting one or more objects of a biological sample into a specific class, which class belongs to a predefined set of classes, the method comprising:
provinding a training set of digital images originating from a plurality of biological samples, each digital image of the training set being labeled with a specific class of the one or more objects of the digital image, each digital image of the training set being associated with global data pertaining to the respective sample, wherein
for each digital image of the training set of digital images:
deriving a first set of input values, wherein each input value pertains to a specific feature of the digital image,
deriving, based at least in part on said associated global data, a second set of input values,
defining a feature vector comprising said first set of input values and said second set of input values, and
the neural network classifier determining, based on the feature vector, a specific class to assign to the digital image, and
training the neural network using image data pertaining to each digital image from the training set of digital images and the global data associated with said digital image as input, and using the specific class of the label of said digital image as a correct output from the neural network.

2. The method according to claim 1, wherein the one or more objects comprise one or more biological cells.

3. The method according to claim 1, wherein the neural network classifier comprises a decision subnet being adapted to receive the feature vector and perform the step of determining the specific class to assign to the digital image.

4. A method for training a neural network classifier to classify a digital image depicting one or more objects of a biological sample into a specific class, which class belongs to a predefined set of classes, the method comprising:
providing a training set of digital images originating from a plurality of biological samples, each digital image of the training set being labeled with a specific class of the one or more objects of the digital image, each digital image of the training set being associated with global data pertaining to the respective sample,
training the neural network using image data pertaining to each digital image from the training set of digital images and the global data associated with said digital image as input, and using the specific class of the label of said digital image as a correct output from the neural network; and
wherein the global data includes data pertaining to an average color of depicted objects of a set of digital images, wherein each digital image of the set depicts one or more objects of a specific biological sample.

5. The method according to claim 3, wherein the neural network classifier further comprises a feature extraction subnet adapted to receive the digital image of the training set, derive the first set of input values therefrom, and populate the feature vector with said first set of input values.

6. The method according to claim 5, wherein the neural network classifier is a convolutional neural network.

7. The method according to claim 6, wherein said second set of input values of the feature vector is derived by the feature extraction subnet.

8. The method according to claim 6, wherein at least a part of said associated global data is coded into pixel data of the respective digital image of the training set such that said at least a part of the global data is being input to the feature extraction subnet as a part of the digital image.

9. The method according to claim 8, wherein at least a part of said associated global data is coded into a coherent area of the pixel data of the respective digital image.

10. The method according to claim 9, wherein the coherent area of the pixel data is color coded so as to reflect a color information included in the global data.

11. The method according to claim 9, wherein said at least a part of said global data is coded into four coherent areas of the pixel data of the digital image, each coherent area being located in a respective corner of the digital image.

12. The method according to claim 1, wherein the neural network classifier consists of two or more fully connected layers.

13. The method according to claim 1, wherein the global data includes data acquired based on an analysis of at least one digital image depicting a calibration area of a microscope slide.

14. The method according to claim 13, wherein the microscope slide comprises one or more chemical reference patches disposed in the calibration area, wherein said chemical reference patches are arranged to react to substances in contact therewith.

15. The method according to claim 14, wherein each of the one or more chemical reference patches are arranged to react to a respective staining agent used for staining the biological sample.

16. The method according to claim 15, wherein each staining agent is at least one from the list of: hematoxylin, eosin, orange G, eosin Y, light green SF yellowish, Bismarck Brown Y, eosinate, methylene blue, azure B, azure A, and methylene violet.

17. The method according to claim 13, wherein the microscope slide comprises one or more imaging test targets disposed in the calibration area, wherein the data acquired based on said analysis pertains at least to the shape of the one or more imaging test targets.

18. The method according to claim 13, wherein the microscope slide is a calibration microscope slide adapted to be used to calibrate a device for capturing the digital image depicting one or more objects of a biological sample.

19. A method for classifying a digital image depicting one or more objects of a biological sample into a specific class, which class belongs to a predefined set of classes, the method comprising:
feeding a digital image depicting one or more objects of a biological sample into a neural network classifier, the neural network classifier being trained for classifying digital images into one of the predefined set of classes using the method according to claim 1,
feeding global data associated with the sample into the neural network classifier, and
the neural network classifier determining, based on at least said digital image and said global data, a specific class to assign to the digital image.

20. An analyzing device for optical analysis of a biological sample, said analyzing device comprising:
optics, including a camera, adapted to capture a digital image depicting one or more objects of a biological sample, a processor adapted to:
determine global data pertaining to the sample based on an analysis of the digital image, and/or receiving global data from an external source,
associate the digital image with the global data, and
perform the method according to claim 13 on the digital image.

21. A computer-readable medium comprising computer code instructions which when executed by a device having processing capability are adapted to perform the method according to claim 1.

* * * * *